US009342472B2

(12) United States Patent
Gao et al.

(10) Patent No.: US 9,342,472 B2
(45) Date of Patent: May 17, 2016

(54) PRD (PHYSICAL REGION DESCRIPTOR) PRE-FETCH METHODS FOR DMA (DIRECT MEMORY ACCESS) UNITS

(75) Inventors: Peng Gao, Taipei County (TW); Yu Huang, Taipei County (TW); Dejian Li, Taipei County (TW)

(73) Assignee: VIA TECHNOLOGIES, INC., TAIPEI (CN)

( * ) Notice: Subject to any disclaimer, the term of this patent is extended or adjusted under 35 U.S.C. 154(b) by 258 days.

(21) Appl. No.: 11/935,429

(22) Filed: Nov. 6, 2007

(65) Prior Publication Data

US 2008/0320176 A1 Dec. 25, 2008

(30) Foreign Application Priority Data

Jun. 22, 2007 (TW) ................................ 96122487 A

(51) Int. Cl.
*G06F 13/28* (2006.01)
*G06F 12/08* (2016.01)

(52) U.S. Cl.
CPC ............ *G06F 13/28* (2013.01); *G06F 12/0875* (2013.01)

(58) Field of Classification Search
USPC ......................................................... 710/22
See application file for complete search history.

(56) References Cited

U.S. PATENT DOCUMENTS

| | | | |
|---|---|---|---|
| 5,440,691 A * | 8/1995 | Carrafiello et al. ............ | 709/234 |
| 5,613,162 A * | 3/1997 | Kabenjian ................ | G06F 13/28 710/22 |
| 5,864,712 A * | 1/1999 | Carmichael et al. ............ | 710/20 |
| 5,898,891 A * | 4/1999 | Meyer ............................. | 710/33 |
| 5,978,866 A * | 11/1999 | Nain ................................ | 710/22 |
| 6,567,953 B1 * | 5/2003 | Pomerantz ..................... | 714/805 |
| 6,963,954 B1 * | 11/2005 | Trehus et al. .................. | 711/137 |
| 7,000,021 B1 * | 2/2006 | Radhakrishnan et al. ..... | 709/230 |
| 7,496,699 B2 * | 2/2009 | Pope et al. ...................... | 710/52 |
| 7,620,749 B2 * | 11/2009 | Biran et al. ...................... | 710/22 |
| 2006/0206635 A1 * | 9/2006 | Alexander et al. .............. | 710/22 |
| 2007/0011364 A1 * | 1/2007 | Wezelenburg .................. | 710/22 |

OTHER PUBLICATIONS

Katz, David et al., "Using Direct Memory Access effectively in media-based embedded applications—Part 1," Jan. 11, 2007, Embedded.com http://www.embedded.com/columns/technicalinsights/196802092?_requestid=288625.*
Katz, David et al., "Using Direct Memory Access effectively in media-based embedded applications—Part 2," Jan. 11, 2007, Embedded.com http://www.embedded.com/columns/technicalinsights/196901318?_requestid=287022.*
Katz, David et al., "Using Direct Memory Access effectively in media-based embedded applications—Part 3," Jan. 26, 2007, Embedded.com http://www.embedded.com/columns/technicalinsights/197000025?_requestid=292813.*
Katz, David et al., "Using Direct Memory Access effectively in media-based embedded applications—Part 4," Jan. 31, 2007, Embedded.com http://www.embedded.com/columns/technicalinsights/197001946?_requestid=293225.*

* cited by examiner

*Primary Examiner* — Idriss N Alrobaye
*Assistant Examiner* — Dayton Lewis-Taylor
(74) *Attorney, Agent, or Firm* — McClure, Qualey & Rodack, LLP

(57) ABSTRACT

PRD (Physical Region Descriptor) pre-fetch methods for DMA (Direct Memory Access) unit are provided. When a DMA out transaction for a memory is performed, it is determined whether a first queue is full or nearly full, wherein the first queue is used to store data corresponding to the DMA out transaction. If the first queue is full or nearly full, at least one PRD entry is read from a first PRD table, and stored to a first cache. When a DMA in transaction for the memory is performed, it is determined whether a second queue is empty or nearly empty, wherein the second queue is used to store data corresponding to the DMA in transaction. If the second queue is empty or nearly empty, at least one PRD entry is read from a second PRD table, and stored to a second cache.

11 Claims, 5 Drawing Sheets

PRD (PHYSICAL REGION DESCRIPTOR) PRE-FETCH METHODS FOR DMA (DIRECT MEMORY ACCESS) UNITS

BACKGROUND OF THE INVENTION

1. Field of the Invention

The disclosure relates generally to DMA (Directly Memory Access) management, and, more particularly to PRD (Physical Region Descriptor) pre-fetch methods for DMA units.

2. Description of the Related Art

In computer architecture, DMA allows specific hardware to independently access the system memory without the use of a CPU (Central Processing Unit). DMA transactions copy memory regions between devices. At the same time, the CPU can be scheduled for other tasks, improving system performance.

PRD entries are stored in a PRD table in the system memory. A PRD entry defines information such as starting address and size of a specific memory block in the memory. Before the DMA operates, the DMA unit usually reads a PRD entry from the PRD table, thus to obtain the starting address and the size of a memory block to be accessed according to the PRD entry. Then, the DMA unit performs access operations to the memory block corresponding to the PRD entry, that is, to write data to the memory block or read data from the memory block. FIG. 1 is a schematic diagram illustrating a conventional DMA unit. As shown in FIG. 1, the DMA unit 300 comprises an interface A 310, an interface B 320, and a cache memory 350. The interface A 310 and the interface B 320 can be used to access the buses A and B, respectively. The cache memory 350 can be used to store the PRD entries pre-fetched by the interface A via the bus A. The DAM unit 300 further comprises a queue A 331 such as FIFO (First In First Out) queue, and a queue B 332. For DMA out transaction, the interface A 310 reads data from the memory 340 via the bus A, and stores the data to the queue A 331. The interface B 320 reads data from the queue A 331, and writes the data to the bus B, thus to transfer the data to a corresponding device, such as SATA or USB device. For DMA in transactions, the interface B 320 reads data from the bus B, and writes the data to the queue B 332. The interface A 310 reads data from the queue B 332, and writes the data to the bus A, thus to write the data to the memory 340. In some cases, few masters are on the bus B, but more masters are on the bus A. For providing best data throughput, the interface B 320 is not expected to be idle, that is data transactions is expected to be performed continuously. In other words, the queue A 331 is not expected to be empty for DMA out transactions, and the queue B 332 is not expected to be full for DMA in transactions.

Usually, the DMA unit 300 uses a "Scatter-Gather" mechanism to reduce the copy steps for data. The "Scatter-Gather" mechanism allows the DMA unit 300 to transfer data to several memory blocks defined by corresponding PRD entries in one data transaction. In other words, the DMA unit 300 can first collect several DMA requests, and then perform DMA transactions correspondingly. In the "Scatter-Gather" mechanism, a PRD pre-fetch mechanism can improve the performance and throughput for the DMA unit. FIG. 2 is a flowchart of a PRD pre-fetch method for a conventional DMA unit. First, in step S210, the interface A 310 reads a PRD entry from a PRD table, and stores the PRD entry to the cache memory 350 of the DMA unit. In step S220, it is determined whether the PRD table is at the end thereof, that is, to determine whether the current PRD entry is the last entry in the PRD table. If not, in step S230, it is determined whether the cache memory 350 is full. If the cache memory 350 is not full (No in step S230), the procedure returns to step S210, continuing to read another PRD entry from the PRD table, and store the PRD entry to the cache memory 350. If the current PRD entry is the last entry in the PRD table (Yes in step S220) or the cache memory 350 is full (Yes in step S230), in step S240, a PRD entry is read from the cache memory 350, and in step S250, a data transaction is performed according to the PRD entry. In step S260, it is determined whether the cache memory 350 is empty. If the cache memory 350 is not empty (No in step S260), the procedure returns to step S240 to read another PRD entry from the cache memory 350, and in step S250, perform a data transaction accordingly. If the cache memory 350 is empty (Yes in step S260), in step S270, it is determined whether the PRD table is at the end thereof. If not, the procedure returns to step S210 to read a PRD entry from the PRD table. If so, the procedure is complete.

For the above described conventional mechanism, when the DMA unit 300 is triggered to start, the DMA unit 300 will pre-fetch PRD entries from the PRD table and store the pre-fetched PRD entries to the cache memory 350 of the DMA unit 300 until the cache memory 350 is full. If the cache memory 350 is full, the DMA unit 300 performs DMA transactions according to the PRD entries within the cache memory 350 until the last PRD entry in the cache memory 350 is finished. Then, the DMA unit 300 will loop back to pre-fetch PRD entries until the last PRD entry in the PRD table is pre-fetched.

For a DMA out transaction in FIG. 2, it is likely that the queue A 331 will go empty when the DMA unit 300 pre-fetches the PRD entries. For a DMA in transaction, it is likely that the queue B 332 will go full when the DMA unit 300 pre-fetches the PRD entries. Specifically, in the DMA out transaction, the DMA transaction corresponding to the last PRD entry is finished on the bus A, while the next DMA transaction will not begin until the fetching of the PRD entries is finished. If the fetching of the PRD entries takes too much time and the interface B continues to read data from the queue A 331, the queue A 331 may be underflow. In the DMA in transaction, the DMA transaction corresponding to the last PRD entry is finished on the bus A, while the next DMA transaction will not begin until the fetching of the PRD entries is finished. If the fetching of the PRD entries takes too much time and the interface B 320 continues to write data to the queue B 332, the queue B 332 may be overflow. The above two cases cause the interface B 320 to go into an idle state to prevent the queue A 331 in underflow or queue B 332 in overflow, eventually leading the performance of data throughput of the DMA unit 300 to descend.

BRIEF SUMMARY OF THE INVENTION

PRD pre-fetch methods for DMA units are provided.

In an embodiment of a PRD pre-fetch method for a DMA unit, when a DMA request is received, a data storage state of a queue is detected to determine whether to pre-fetch a PRD entry, wherein the queue is used to store data corresponding to the DMA request. If it is determined to pre-fetch the PRD entry, at least one PRD entry is read from a PRD table, and stored to a cache memory. If it is determined not to pre-fetch the PRD entry, a PRD entry is read from the cache memory, and a DMA transaction is performed according to the PRD entry.

In an embodiment of a PRD pre-fetch method for a DMA unit, when a DMA out transaction for a memory is performed, it is determined whether a first queue has a first predefined size of available space, wherein the first queue is used to store data corresponding to the DMA out transaction. If the first queue does not have the first predefined size of available space, at least one PRD entry is read from a first PRD table, and stored to a first cache memory. When a DMA in transaction for the memory is performed, it is determined whether a second queue has a second predefined size of data, wherein the second queue is used to store data corresponding to the DMA in transaction. If the second queue does not have the second predefined size of data, at least one PRD entry is read from a second PRD table, and stored to a second cache memory.

In an embodiment of a PRD pre-fetch method for a DMA unit, when a DMA out transaction for a memory is performed, it is determined whether a first queue is full or nearly full, wherein the first queue is used to store data corresponding to the DMA out transaction. If the first queue is full or nearly full, at least one PRD entry is read from a first PRD table, and stored to a first cache memory. When a DMA in transaction for the memory is performed, it is determined whether a second queue is empty or nearly empty, wherein the second queue is used to store data corresponding to the DMA in transaction. If the second queue is empty or nearly empty, at least one PRD entry is read from a second PRD table, and stored to a second cache memory.

PRD pre-fetch methods for DMA units may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
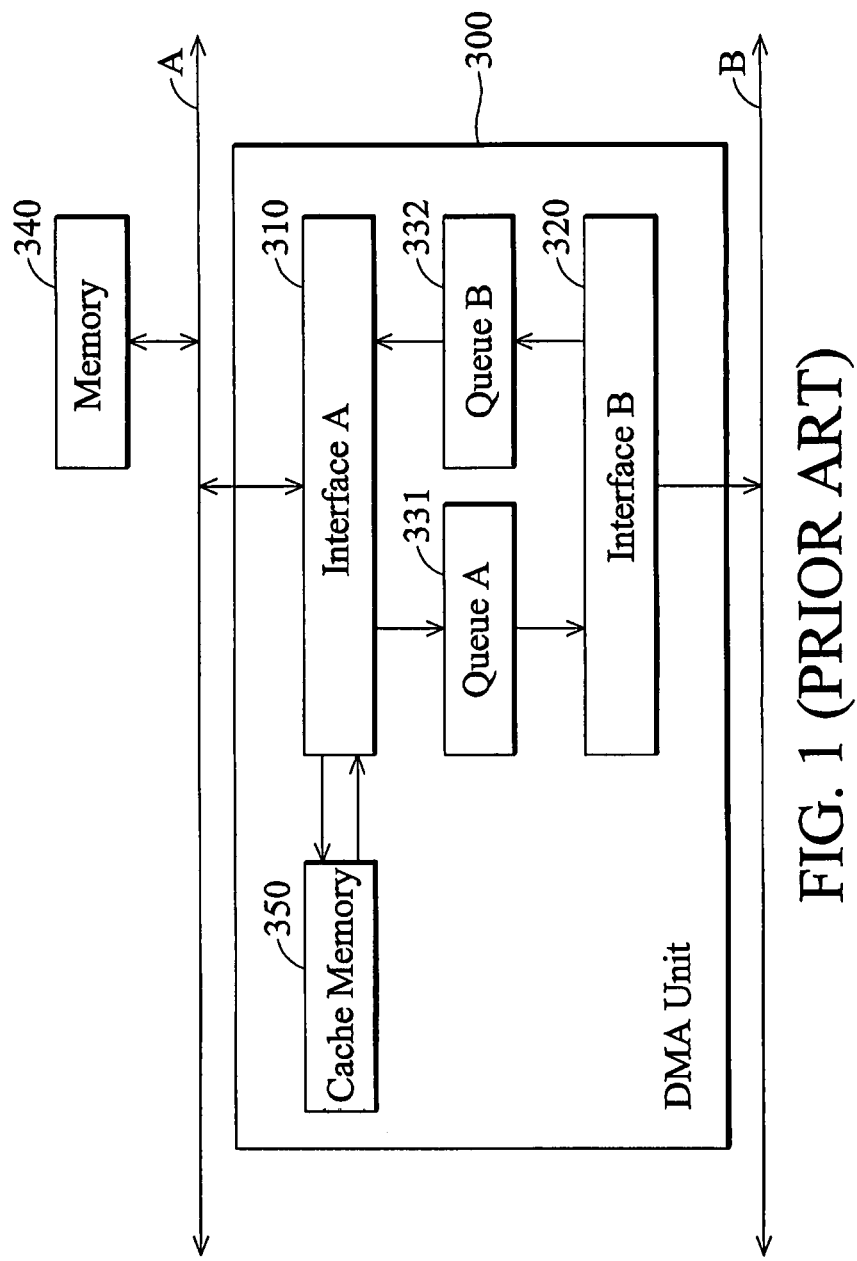
FIG. 1 is a schematic diagram illustrating a conventional DMA unit.
Figure 2:
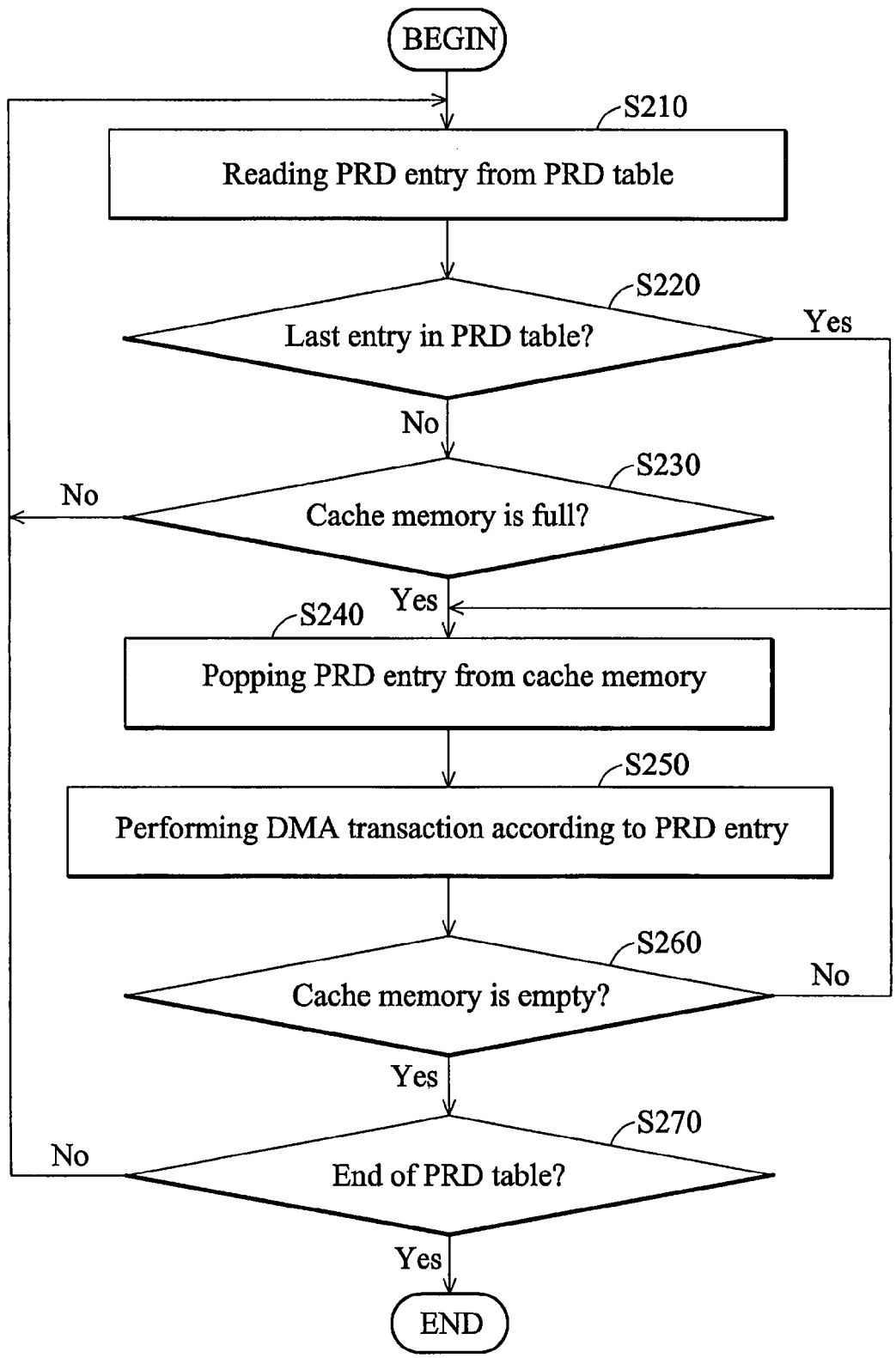
FIG. 2 is a flowchart of a PRD pre-fetch method for a conventional DMA unit.

PRD pre-fetch methods for DMA units are provided. The PRD pre-fetch methods are suitable for use in a DMA unit comprising similar architecture as shown in FIG. 1. The DMA unit comprises a first interface (interface A) and a second interface (interface B) used to access a first bus (bus A) and a second bus (bus B), respectively. The DMA unit couples to a memory via the first bus. The DMA unit comprises a first queue (queue A) and a second queue (queue B). For DMA out transactions, the first interface reads data from the memory via the first bus, and stores the data to the first queue. The second interface reads data from the first queue, and writes the data to the second bus. For DMA in transactions, the second interface reads data from the second bus, and writes the data to the second queue. The first interface reads data from the second queue, and writes the data to the first bus, thus to write the data to the memory. It is noted that the DMA unit comprises at least one cache memory for storing PRD entries pre-fetched from at least one PRD table.

Figure 3:
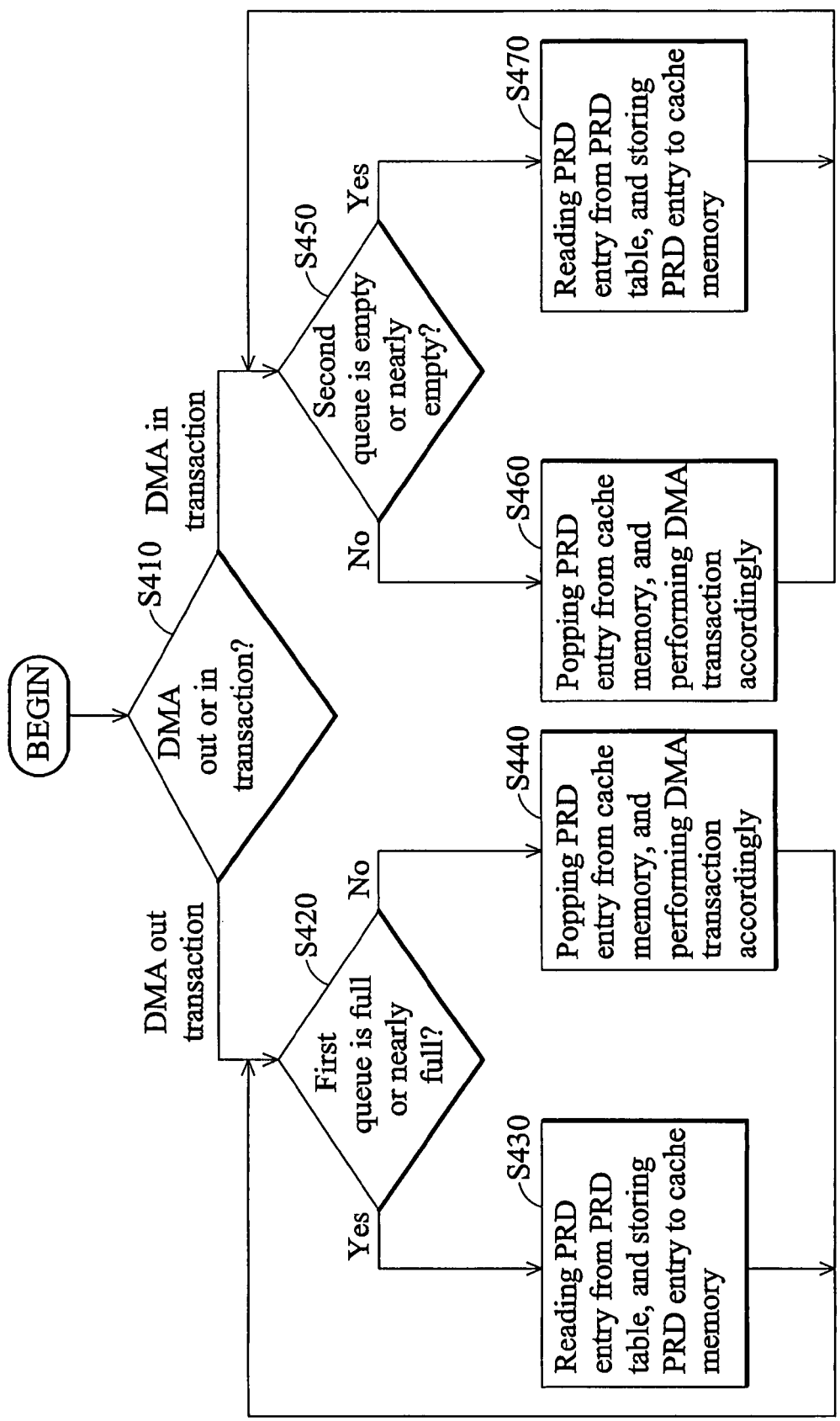
FIG. 3 is a flowchart of an embodiment of a PRD pre-fetch method for a DMA unit according to the invention.

FIG. 3 is a flowchart of an embodiment of a PRD pre-fetch method for a DMA unit according to the invention.

In step S410, it is determined whether the DMA unit performs a DMA out transaction or DMA in transaction, that is, to determine whether a received DMA request is a DMA out transaction or a DMA in transaction. If a DMA out transaction is performed, in step S420, it is determined whether the first queue is full or nearly full. In other words, it is determined whether to pre-fetch a PRD entry by detecting the data storage state of the first queue. If the first queue is full or nearly full (Yes in step S420), representing allowance of the fetching of PRD entry, in step S430, at least one PRD entry is read from a first PRD table, and stored to a first cache memory. If the first queue is not full or nearly full (No in step S420), in step S440, a PRD entry is obtained from the first cache memory, and a DMA transaction is performed according to the obtained PRD entry. The procedure then returns to step S420. If a DMA in transaction is performed, in step S450, it is determined whether the second queue is empty or nearly empty. In other words, it is determined whether to pre-fetch a PRD entry by detecting the data storage state of the second queue. If the second queue is not empty or nearly empty (No in step S450), in step S460, a PRD entry is obtained from a second cache memory, and a DMA transaction is performed according to the obtained PRD entry. The procedure then returns to step S450. If the second queue is empty or nearly empty (Yes in step S450), in step S470, at least one PRD entry is read from a second PRD table, and stored to the second cache memory. The procedure then returns to step S450. It is understood that the first cache memory and the second cache memory may be parts of the cache memory of the DMA unit in some embodiments.

Details for DMA out transaction and DMA in transaction are discussed follow.

Figure 4:
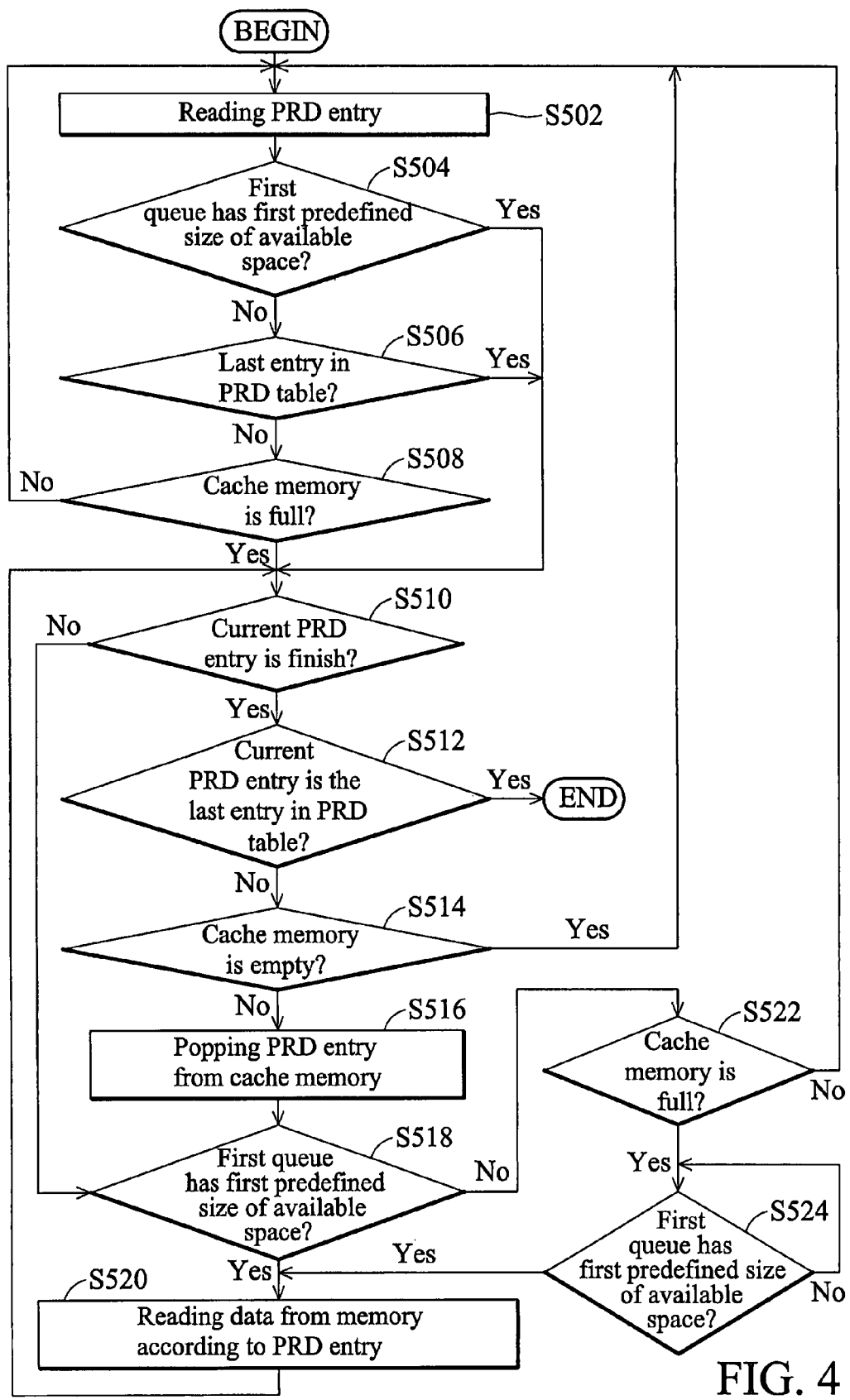
FIG. 4 is a flowchart of an embodiment of a PRD pre-fetch method for a DMA unit for DMA out transaction according to the invention.

FIG. 4 is a flowchart of an embodiment of a PRD pre-fetch method for a DMA unit for DMA out transaction according to the invention.

When the DMA unit performs a DMA out transaction, in step S502, a PRD entry is read from a PRD table, and the fetched entry is stored to the cache memory. In step S504, it is determined whether the first queue has a first predefined size of available space. It is noted that step S504 is used to determine whether the first queue is full or nearly full. The first predefined size can be set as the burst length supported by the second interface, or any other value according to various requirements. Usually, the burst length supported by the second interface is greater than the size of memory block corresponding to a single PRD entry. If the first queue has the first predefined size of available space (Yes in step S504), the procedure goes to step S510. If the first queue does not have the first predefined size of available space (No in step S504), in step S506, it is determined whether the fetched PRD entry in step S502 is the last entry of the PRD table. If so (Yes in step S506), the procedure goes to step S510. If not (No in step S506), in step S508, it is determined whether the cache memory is full. If the cache memory is not full (No in step S508), the procedure returns to step S502. If the cache memory is full (Yes in step S508), in step S510, it is determined whether a DMA transaction corresponding to a current PRD entry is finished, that is, to determine whether the first interface has read the data in the corresponding memory block according to the current PRD entry. If the DMA transaction corresponding to the current PRD entry is not finished (No in step S510), the procedure goes to step S518. If the DMA transaction corresponding to the current PRD entry is finished (Yes in step S510), in step S512, it is determined whether the current PRD entry is the last entry of the PRD table. If so (Yes in step S512), the procedure is complete. If the current PRD entry is not the last entry of the PRD table (No in step S512), in step S514, it is determined whether the cache memory is empty. If the cache memory is empty (Yes in step S514), the procedure returns to step S502. If the cache memory is not empty (No in step S514), in step S516, a PRD entry is popped from the cache memory. Then, in step S518, it is determined whether the first queue has the first predefined size of available space. If the first queue has the first predefined size of available space (Yes in step S518), in step S520, a DMA transaction is performed according to the popped PRD entry, and the procedure returns to step S510. If the first queue does not have the first predefined size of available space (No in step S518), in step S522, it is determined whether the cache memory is full. If the cache memory is not full (No in step S522), the procedure returns to step S502. If the cache memory is full (Yes in step S522), in step S524, it is determined whether the first queue has the first predefined size of available space. If the first queue does not have the first predefined size of available space (No in step S524), step S524 repeats until the first queue has the first predefined size of available space, that is, to wait till the second interface transfers the data on the first queue to the second bus. If the first queue has the first predefined size of available space (Yes in step S524), in step S520, a DMA transaction is performed according to the popped PRD entry, that is, the first interface reads the data in the memory block corresponding to the popped entry via the first bus. The procedure then returns to step S510. At this time, the current PRD entry in step S510 becomes the popped PRD entry from the cache memory in step S516. It is understood that, if no PRD entry is popped from the cache memory to become a new current PRD entry when step S510 performs, it is determined the DMA transaction corresponding to the current PRD entry is finished. If no new current PRD entry is obtained when step S512 executes, it is determined the current PRD entry is not the last PRD entry in the PRD table.

Figure 5:
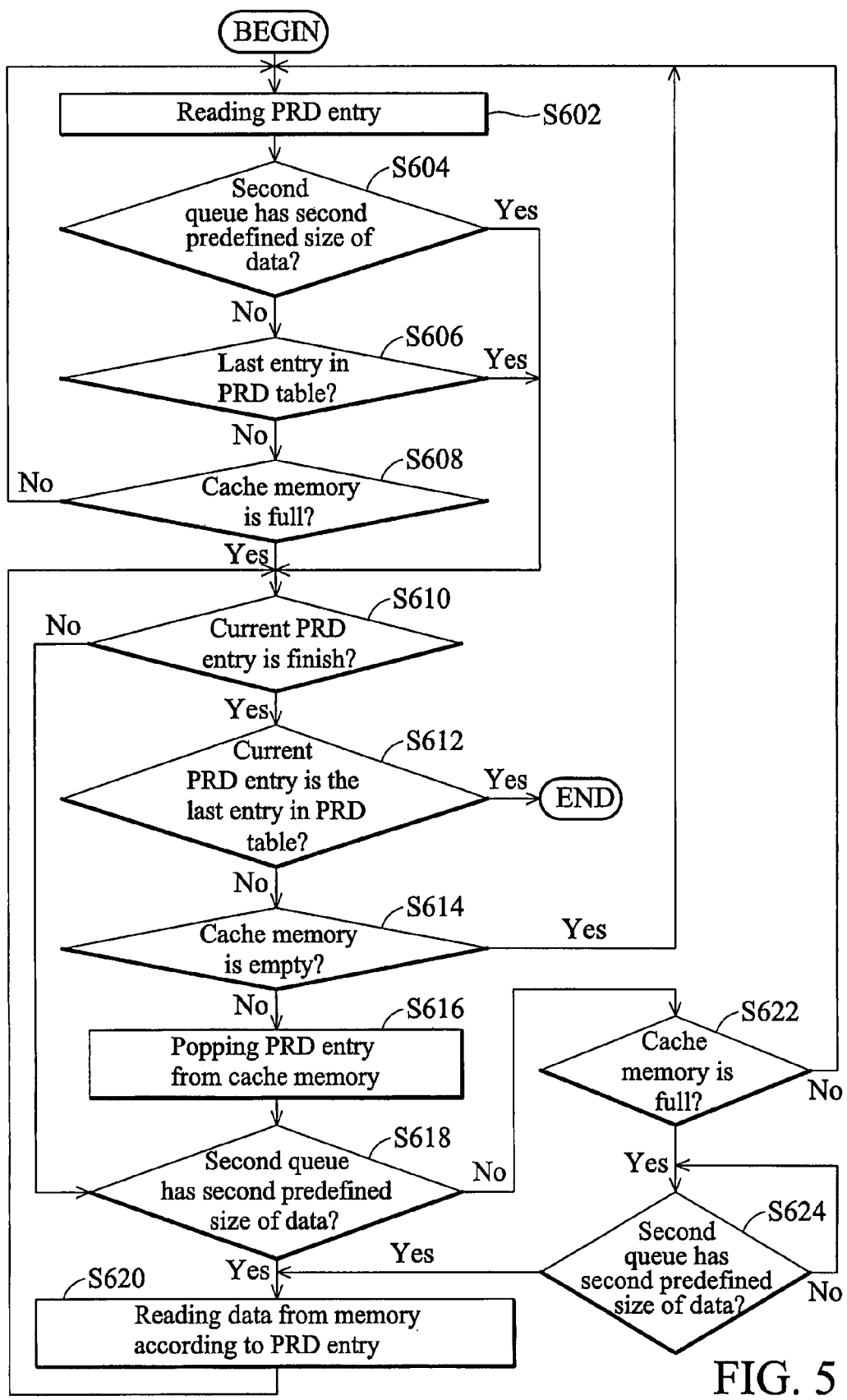
FIG. 5 is a flowchart of an embodiment of a PRD pre-fetch method for a DMA unit for DMA in transaction according to the invention.

FIG. 5 is a flowchart of an embodiment of a PRD pre-fetch method for a DMA unit for DMA in transaction according to the invention.

When the DMA unit performs a DMA in transaction, in step S602, a PRD entry is read from a PRD table, and the fetched entry is stored to the cache memory. In step S604, it is determined whether the second queue has a second predefined size of data. It is noted that step S604 is used to determine whether the second queue is empty or nearly empty. The second predefined size can be set as the burst length supported by the first interface, or any other value according to various requirements. Usually, the burst length supported by the first interface is greater than the size of memory block corresponding to single PRD entry. If the second queue has the second predefined size of data (Yes in step S604), the procedure goes to step S610. If the second queue does not have the second predefined size of data (No in step S604), in step S606, it is determined whether the fetched PRD entry is the last entry of the PRD table. If so (Yes in step S606), the procedure goes to step S610. If not (No in step S606), in step S608, it is determined whether the cache memory is full. If the cache memory is not full (No in step S608), the procedure returns to step S602. If the cache memory is full (Yes in step S608), in step S610, it is determined whether a DMA transaction corresponding to a current PRD entry is finished, that is, to determine whether the first interface has written data to the corresponding memory block according to the current PRD entry. If the DMA transaction corresponding to the current PRD entry is not finished (No in step S610), the procedure goes to step S618. If the DMA transaction corresponding to the current PRD entry is finished (Yes in step S610), in step S612, it is determined whether the current PRD entry is the last entry of the PRD table. If so (Yes in step S612), representing no more PRD entry can be read from the PRD table, the procedure is complete. If the current PRD entry is not the last entry of the PRD table (No in step S612), in step S614, it is determined whether the cache memory is empty. If the cache memory is empty (Yes in step S614), the procedure returns to step S602, and another PRD entry is read. If the cache memory is not empty (No in step S614), in step S616, a PRD entry is popped from the cache memory. Then, in step S618, it is determined whether the second queue has the second predefined size of data. If the second queue has the second predefined size of data (Yes in step S618), in step S620, a DMA transaction is performed according to the popped PRD entry, that is the first interface writes the data from the second queue to the memory block corresponding to the popped PRD entry via the first bus, and the procedure returns to step S610. If the second queue does not have the second predefined size of data (No in step S618), in step S622, it is determined whether the cache memory is full. If the cache memory is not full (No in step S622), the procedure returns to step S602. If the cache memory is full (Yes in step S622), in step S624, it is determined whether the second queue has the second predefined size of data. If the second queue does not have the second predefined size of data (No in step S624), step S624 repeats until the second queue has the second predefined size of data, that is, to wait till the second interface stores the data transferred by the second bus to the second queue. If the second queue has the second predefined size of data (Yes in step S624), in step S620, a DMA transaction is performed according to the popped PRD entry, and the procedure returns to step S610.

In this embodiment, for DMA out transactions, the pre-fetching of PRD entries is performed when the first queue is full or nearly full. For DMA in transactions, the pre-fetching of PRD entries is performed when the second queue is empty or nearly empty. The PRD pre-fetch methods of the embodiments change the timing for pre-fetching PRD entries to prevent the queues of the DMA unit in underflow or overflow, improving the performance of data throughput of the DMA unit.

PRD pre-fetch methods for DMA units, or certain aspects or portions thereof, may take the form of a program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A Physical Region Descriptor (PRD) pre-fetch method for a Direct Memory Access (DMA) unit, comprising:
   determining whether a DMA request comprises a DMA out request or a DMA in request;
   monitoring a queue by detecting a data storage state of the queue to determine whether to pre-fetch a PRD entry when the DMA request is received, wherein the queue is used to store data corresponding to the DMA request;
   when the queue is full and cannot hold any more data from a memory for the DMA out request or the queue is empty and cannot give any more data to the memory for the DMA in request, pre-fetching at least one PRD entry from a PRD table and storing the PRD entry to a cache memory; and once the queue is not full for the DMA out request or the queue is not empty for the DMA in request, stopping pre-fetching the PRD entry from the PRD table; and
   reading a current PRD entry from the cache memory and performing a DMA out transaction according to the current PRD entry once the queue is not full for the DMA out request, or performing a DMA in transaction according to the current PRD entry once the queue is not empty for the DMA in request.

2. The method of claim 1 further comprising:
   determining whether the PRD entry read from the PRD table is the last PRD entry of the PRD table; and
   if so, stop reading of the PRD entry from the PRD table.

3. The method of claim 1 further comprising:
   determining whether the cache memory is full; and
   if so, stop reading of the PRD entry from the PRD table.

4. The method of claim 1 further comprising:
   determining whether the DMA transaction corresponding to the current PRD entry is finished;
   determining whether to pre-fetch a PRD entry according to the data storage state of the queue, if the DMA transaction corresponding to the PRD entry is not finished; and
   performing the DMA transaction corresponding to the current PRD entry if it is determined not to pre-fetch a PRD entry.

5. The method of claim 4 further comprising:
   determining whether the current PRD entry is the last PRD entry of the PRD table; and
   if so, finishing the DMA transaction corresponding to the current PRD entry.

6. The method of claim 4 further comprising:
   determining whether the cache memory is empty; and
   if so, reading at least one PRD entry from the PRD table, and storing the PRD entry to the cache memory.

7. The method of claim 6 further comprising:
   reading the current PRD entry from the cache memory if the cache memory is not empty;
   detecting the data storage state of the queue to determine whether to pre-fetch a PRD entry; and
   performing the DMA transaction corresponding to the current PRD entry if it is determined not to pre-fetch a PRD entry.

8. The method of claim 4 further comprising:
   determining whether the cache memory is full, if it is determined to pre-fetch a PRD entry; and
   reading at least one PRD entry from the PRD table and storing the PRD entry to the cache memory, if the cache memory is not full.

9. A Physical Region Descriptor (PRD) pre-fetch method for a Direct Memory Access (DMA) unit, comprising:
   monitor a first queue, and determining whether the first queue id full if a DMA out transaction for a memory is performed requested, wherein the first queue is used to store data corresponding to the DMA out transaction;
   when the first queue us full and cannot hold any more data from a memory, pre-fetching at least one PRD entry from a PRD table and storing the PRD entry to a first cache memory, and once the first queue is not full, stopping pre-fetching the PRD entry from the PRD table;
   reading a first current PRD entry from the first cache memory and performing the DMA out transaction according to the first current PRD entry once the first queue is not full;
   monitor a second queue, and determining whether the second queue is empty if a DMA in transaction for the memory is performed requested, wherein the second queue is used to store data corresponding to the DMA in transaction; and
   when the second queue is empty and cannot give any more data to the memory, pre-fetching at least one PRD entry from the PRD table and storing the PRD entry to a second cache memory, and once the second queue is not empty, stopping pre-fetching the PRD entry from the PRD table;
   reading a second current PRD entry from the second cache memory and performing the DMA in transaction according to the second current PRD entry once the second queue is not empty.

10. The method of claim 9 further comprising:
    determining whether the DMA out transaction corresponding to a PRD entry read from the first cache memory is finished;
    determining whether the first queue is full if the DMA out transaction corresponding to the PRD entry is not finished; and
    performing the DMA out transaction corresponding to the PRD entry to read data from the memory and store the data to the first queue, if the first queue is not full.

11. The method of claim 9 further comprising:
    determining whether the DMA in transaction corresponding to a PRD entry read from the second cache memory is finished;
    determining whether the second queue is empty if the DMA in transaction corresponding to the PRD entry is not finished; and
    performing the DMA in transaction corresponding to the PRD entry to read data from the second queue and write the data to the memory if the second queue is not empty.

* * * * *

UNITED STATES PATENT AND TRADEMARK OFFICE
CERTIFICATE OF CORRECTION

PATENT NO. : 9,342,472 B2
APPLICATION NO. : 11/935429
DATED : May 17, 2016
INVENTOR(S) : Gao et al.

Page 1 of 1

It is certified that error appears in the above-identified patent and that said Letters Patent is hereby corrected as shown below:

Title Page Item 73 please delete "CN" as the country of Assignee and insert --TW--

Signed and Sealed this
Second Day of August, 2016

Michelle K. Lee
*Director of the United States Patent and Trademark Office*